United States Patent Office 2,864,395
Patented Dec. 16, 1958

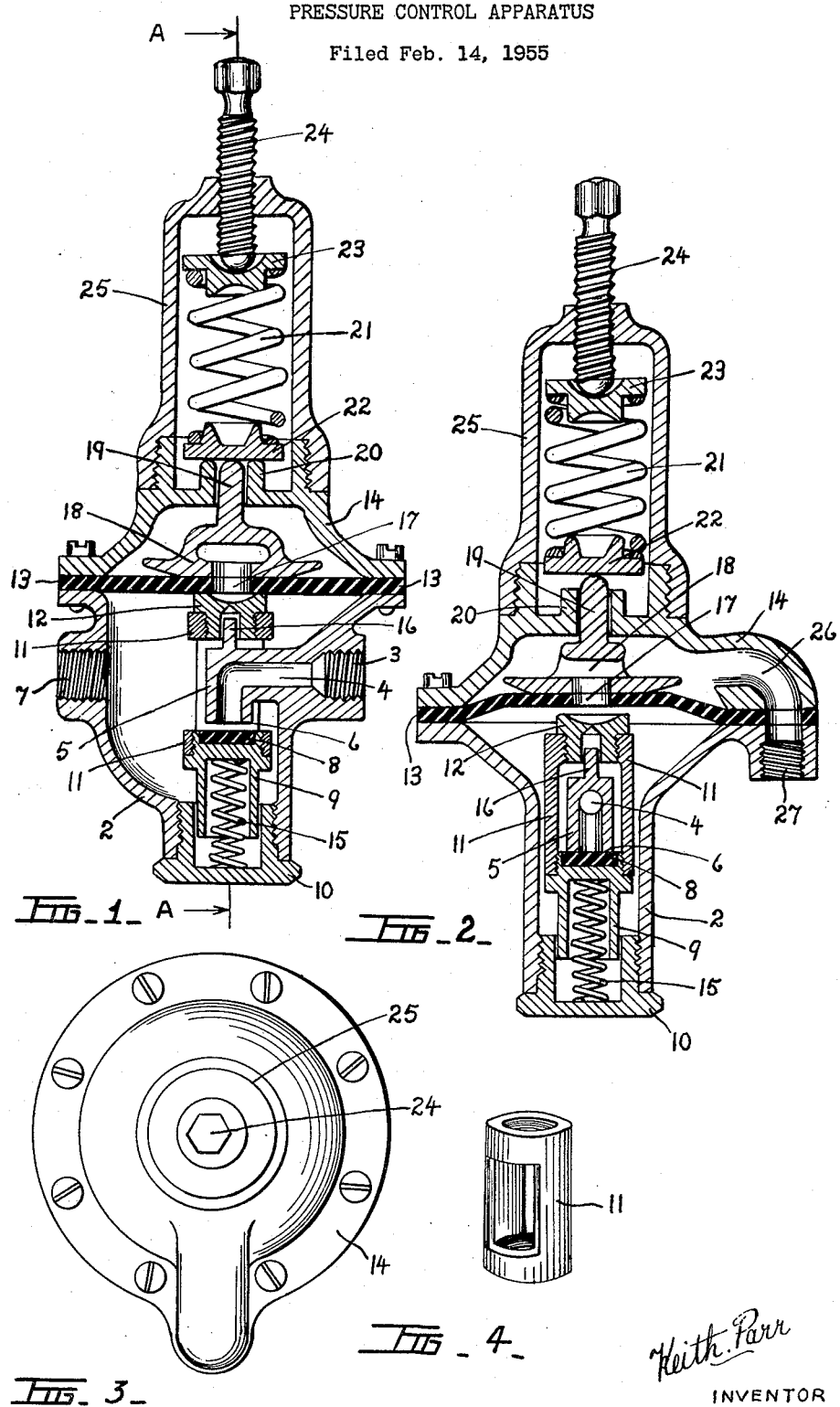

2,864,395

PRESSURE CONTROL APPARATUS

Keith Parr, Rosanna, Melbourne, Victoria, Australia

Application February 14, 1955, Serial No. 488,011

Claims priority, application Australia February 18, 1954

16 Claims. (Cl. 137—116.5)

This invention relates to the class of apparatus used to control the pressure of air, water or other gas or liquid in pressure vessels, pipe lines and the like.

It particularly concerns the class of valvular apparatus commonly known as pressure reducing valves and used to automatically reduce and govern the pressure and flow of air, water or the like and to maintain a substantially even reduced pressure of same regardless of fluctuations in the supply pressure to the valve and/or fluctuations in the flow demand of reduced or delivery pressure.

Usually in this class of apparatus a valvular device controlling a passageway is actuated by the influence of pressure, from the passageway at the opposite side of the valvular device to which the pressure is supplied, against a spring controlled diaphragm or the equivalent. The influence of pressure against the diaphragm causes it to move against its controlling spring and the valvular device, being actuated by the diaphragm, is caused to close or control the passageway so as to maintain a delivery pressure according to the diaphragm controlling spring adjustment.

Leakage of the pressure controlling valvular device which often occurs due to wear of the valve faces or by extraneous matter becoming lodged therebetween can be dangerous and may cause damage to the apparatus being pressure controlled by the valve.

To overcome the danger of the resulting increase in pressure upon leakage of the pressure reducing valve, a safety means comprising a spring controlled poppet valve is usually used to discharge the excess pressure. However, in apparatus where accurate pressure control is necessary such as pressurised domestic hot water storage tanks or the like or where a limited air pressure is used to facilitate quick emptying of oil and petrol drums the preferred accurate safety means is a diaphragm operated safety or pressure relief valve, but the general use of such diaphragm operated safety valves has been somewhat limited for reason that independent manual adjustment of the safety valve is necessary particularly when the required delivery pressure at the pressure reducing valve is varied and the expense of such diaphragm operated safety valves is apt to somewhat deter their general use.

In apparatus of this class at present known wherein a diaphragm with a single means of adjustment actuates both a pressure reducing valve and an excess pressure relieving valve there is usually no automatic means of adjustment in relation of one valve to the other by which, for instance, to compensate for wear or distortion of either or both valves which could occur, particularly when rubber or other resilient valve material is used, and alter to some extent the original excess pressure setting at which the relief valve was set to operate and this, in some instances, can cause the pressure relief valve to open before the pressure reducing valve is closed. Also in this known apparatus, the construction usually provides a pressure reducing means wherein the valve controlling the pressure supply is closed in the same direction as the pressure supply flow and this arrangement is apt to generally cause considerable chattering or hammering of the valve particularly when liquid is being controlled.

The primary object of the present invention is to provide in pressure control apparatus of the class described, a means of relieving excess pressure caused by leakage of the pressure reducing valve or otherwise, which operates in a positive, accurate and therefore safe manner.

Another object of the invention is to provide in such pressure controlling apparatus a means of automatically adjusting the pressure relieving means at the same time as the pressure reducing valve is adjusted to alter or set the delivery or reduced pressure.

A further object of the invention is to provide a pressure control apparatus of the class described in which hammering or chattering of the pressure reducing valve is obviated without the use of special means such as a lever or an additional diaphragm.

In a particular embodiment of the invention to be described below, a hollow valve casing having an inlet and outlet on the same side of a diaphragm which spans the flanged casing bore at one end thereof has a cover cap closing the casing bore at the opposite end. Accommodated in the casing are two valves connected together by a frame which is slidingly supported between the diaphragm and the cover cap.

One valve is seated against the inner face of the diaphragm and closes an excess pressure discharge port formed through the diaphragm. The other valve controls the casing inlet and its seat is formed on a member projecting into the casing from its sidewall. The axis of the seat bore is disposed perpendicularly to the diaphragm and the seat bore communicates at right angles with the casing inlet. Both valves are pressed against their seats by a helical spring bearing against their connecting frame. The valve controlling the casing inlet engages its seat against the direction of pressure flow through the casing inlet. A stronger helical controlling spring bears against the outer side of the diaphragm and may be adjusted and set by means of a screw.

In operation, air, water or the like is forced under pressure into the casing through the casing inlet past the valve controlling the inlet for delivery through the casing outlet. When the pressure in the casing has been built up against the inner side of the diaphragm sufficiently to counteract the spring pressure on its other side, the diaphragm moves against the spring.

The weaker spring bearing against the sliding frame carrying the two valves presses the valve controlling the diaphragm port firmly against its seat and at the same time causes the frame to move with the diaphragm until the other valve controlling the casing inlet reaches its seat thus preventing further increase of pressure in the valve casing and consequent further movement of the diaphragm. Thus when the requisite pressure is built up in the valve casing both valves are pressed against their seats by the influence of the weaker spring against the frame carrying them.

Any excess of the requisite pressure, which may be caused by leakage of the valve controlling the casing inlet or otherwise, causes the diaphragm to move further against its controlling spring and away from the diaphragm port closing valve which, being connected with the valve controlling the casing inlet, cannot move further with the diaphragm after the casing inlet valve has reached its seat thus allowing the excess pressure to be discharged through the diaphragm discharge port.

By this arrangement, adjustment of the diaphragm controlling spring to attain the requisite reduced pressure at the pressure controlling valve, automatically causes the pressure relieving valve to be adjusted to discharge or relieve pressure in excess of that at which the pressure controlling valve is set to operate and at the same time the operating relationship of the pressure relieving valve and the pressure reducing valve is self adjusting or the compensation for wear or distortion of the valves and seats is automatic.

A means of increasing or varying the excess pressure at which the relief valve will operate can be provided and may comprise an additional adjustable spring attached to the diaphragm port closing valve by means of a connecting stem through the diaphragm port and this spring, by adjustment, may cause the diaphragm port closing valve to be held more firmly against its seat this necessitating increased excess pressure against the diaphragm to cause it to move from the valve.

To prevent the diaphragm controlling spring from exerting its full pressure against the diaphragm port closing valve which may occur and damage the valve seat particularly when the apparatus is not under pressure, a stopping means may be provided between the spring and the diaphragm and the spring pressure may be conveyed to the diaphragm by a diaphragm pressure supporting plate formed so that the spring pressure is distributed evenly to the diaphragm and to the face of the valve seated against its opposite side.

However, in order that the invention may be better understood, reference is made to the accompanying drawings in which:

Figure 1 is a cross-sectional view of a pressure control device embodying the principal features of the invention and shows the pressure reducing valve held in its open position by force of the diaphragm movement against the pressure relieving valve.

Figure 2 is a cross-sectional view taken on lines A—A of Figure 1 and shows the pressure reducing valve in its closed position while the pressure relieving valve is operating.

Figure 3 is a plan view of Figure 1.

Figure 4 is a perspective view of the valve connecting frame seen in Figure 1 and Figure 2.

As seen in Figure 1 there is a valve casing 2 having a screw threaded pressure inlet 3 communicating with a passageway 4 of a pipe section extending at right angles through an inwardly projecting member 5 to terminate at a valve seat 6 through which pressure passes into the casing 2 for delivery through a screw threaded pressure delivery outlet 7. Pressure passing through the bore of the valve seat 6 is controlled by a valve 8 supported in a recessed valve guide member 9 which is slidingly accommodated in the bore of a screw threaded closing cap 10.

Screw threaded at one end to the valve guide member 9 is a connecting frame 11 the opposite end of which is screw threaded to removably accommodate a pressure relieving valve 12 seating against one side of a diaphragm 13 which spans the flanged bore of the valve casing 2 to which it is clamped by a corresponding flanged cover member 14. Both the pressure inlet controlling valve 8 and the pressure relieving valve 12 are closed together or independently against their seats, when operating, by a helical spring 15 and the pressure relieving valve 12 is bored or recessed to accommodate a guide pin 16 formed on the projecting member 5.

Formed in the diaphragm 13 and controlled by the pressure relieving valve 12 is a pressure discharge port 17 communicating with a corresponding opening in a diaphragm supporting plate 18 having a shank 19 by which it is guided in a corresponding guide hole bored through a spring pressure stopping member 20 formed in the cover member 14.

A diaphragm controlling spring 21 is disposed between a spring pressure plate 22 and a spring cap 23 and is adjustable by means of a screw 24 threaded through one end of a spring cover 25 the opposite end of which is screw threaded to the cover member 14.

As best seen in Figure 2 the cover member 14 is formed to provide a pressure discharge passageway 26 which directs pressure relieved through the diaphragm port 17 and any pressure leakage through the diaphragm 13, to a screw threaded pressure discharge outlet 27 formed integrally with the valve casing 2 so that the diaphragm 13 may be replaced without removing a pressure discharge pipe which may be fitted to the outlet 27.

In operation, pressure of air, water or the like supplied to the inlet 3 passes through the passageway 4 and the valve seat 6 into the valve casing 2 for delivery through the outlet 7 to the apparatus being pressure controlled.

When the pressure in the casing 2 has been built up against the diaphragm 13 sufficiently to counteract the pressure of the spring 21 the diaphragm moves against the said spring and at the same time the spring 15 bearing against the guide member 9 and the connecting frame 11 presses the valve 12 against its seat and moves the connecting frame 11 with the diaphragm 13 until the valve 8 reaches its seat 6 which closes the passageway 4 thus preventing pressure increase in the casing 2 and further movement of the diaphragm 13.

Any excess of this pressure in the casing 2, which may be caused by leakage of the valve 8 or otherwise, causes the diaphragm 13 to move further against the spring 21 and away from the valve 12 thus allowing the excess pressure to be discharged through the diaphragm port 17 and the passageway 26 to the outlet 27.

The spring stopping member 20 prevents the spring 21 from exerting its full pressure against the valve 12, the seat of which, when composed of rubber or other resilient material, may otherwise be damaged or distorted particularly when the apparatus is not under pressure.

The adjusting screw 24 may be sealed in the spring cover 25 which, in turn, can be sealed to the cover member 14 so that the setting of the spring 21 cannot be altered when the diaphragm 13 is replaced.

By modifying and hollowing the screw 24, the spring cap 23, the plate 22 and the guide shank 19, access is provided for adjustment, while the valve is under pressure, of the means of increasing or varying the excess pressure setting of the pressure relieving valve hereinbefore referred to.

Plugging of the pressure inlet 3 renders the apparatus described usable as a sensitive pressure relieving valve.

Having now fully described and ascertained my said invention and the manner in which it is to be performed, I declare that what I claim is:

1. A pressure control apparatus comprising a casing provided with an inlet port and an outlet port, a pipe section within said casing and provided with a passageway in communication with said inlet port, a pressure control valve seat at the end of said pipe section, a pressure control valve, means urging the pressure control valve to engage said seat against the direction of pressure flow in said passageway, a cover member secured to said casing and provided with an outlet, a diaphragm clamped between said casing and said cover member and provided with a pressure discharge port, a pressure relief valve controlling said pressure discharge port, means connecting said pressure relief valve with said pressure control valve, whereby both valves are movable in unison in the same direction, and a spring in said cover member urging said diaphragm toward said pressure relief valve, said pressure relief valve being held closed by said means urging said pressure control valve to engage said seat.

2. A pressure control apparatus as defined in claim 1, wherein said pressure relief valve seats directly against said diaphragm, on the casing side thereof in closing off said pressure discharge port.

3. A pressure control apparatus as defined in claim 1, including a diaphragm-supporting plate through which the pressure of said spring is transmitted to said diaphragm, and abutment means for limiting the movement of said diaphragm.

4. A pressure control apparatus as defined in claim 1, wherein said casing is provided with a further outlet port separated from the remainder of said casing by said diaphragm, said diaphragm being provided with an opening affording communication between said outlet in said cover member and said further outlet in said casing, whereby fluid passing into said cover member through said pressure discharge port will be discharged by passing successively through said outlet in said cover member, said opening in said diaphragm and said further outlet in said casing.

5. A pressure control apparatus as defined in claim 1, including guide means on said pipe section, said pressure relief valve being directed by said guide means to act on said pressure discharge port of said diaphragm.

6. A pressure control apparatus comprising a casing provided with an inlet port, an outlet port and a further outlet port, a pipe section within said casing and provided with a passageway in communication with said inlet port, a pressure control valve seat at the end of said pipe section, a pressure control valve, a first spring urging said pressure control valve to engage said seat against the direction of pressure flow in said passageway, a cover member secured to said casing and provided with an outlet, a diaphragm clamped between said casing and said cover member and provided with a pressure discharge port and an opening, said opening affording communication between said outlet in said cover member and said further outlet port in said casing, a pressure relief valve controlling said pressure discharge port and adapted to seat directly against said diaphragm on the casing side thereof to close said pressure discharge port, means connecting said pressure relief valve with said pressure control valve whereby both valves are movable in unison in the same direction, a second spring in said cover member urging said diaphragm toward the pressure relief valve, a diaphragm-supporting plate through which the pressure of said second spring is transmitted to said diaphragm, and abutment means for limiting the movement of said diaphragm under the influence of said second spring, whereby fluid passing into said cover member through said pressure discharge port in said diaphragm into the cover member will be discharged by passing successively through said outlet in said cover member, said opening in said diaphragm and said further outlet in said casing.

7. A pressure control apparatus comprising a casing provided with an inlet port and an outlet port, a pipe section within said casing and provided with a passageway in communication with said inlet port, a pressure control valve seat at the end of said pipe section, a pressure control valve, means urging said pressure control valve to engage said seat against the direction of pressure flow in said passageway, a cover member secured to said casing and provided with an outlet, a diaphragm clamped between said casing and said cover member and provided with a pressure discharge port, a pressure relief valve controlling said pressure discharge port, means connecting said pressure relief valve with said pressure control valve whereby both valves are movable in unison in the the same direction, a spring in the cover member urging said diaphragm toward said pressure relief valve, a diaphragm-supporting plate within said cover member and provided with a shank through which the pressure of said spring is transmitted to said diaphragm, a spring pressure plate interposed between said spring and said shank, and abutment means for limiting the movement of said spring pressure plate and thereby also limiting the movement of said diaphragm under the influence of said spring, said abutment means guiding said shank during movement of the latter, whereby increased pressure within said casing will serve to displace said diaphragm to thereby temporarily bleed off excess pressurized fluid into said cover member through said pressure discharge port, said spring causing said pressure control valve to close said passageway so that the pressure in said casing drops.

8. A pressure control apparatus comprising a casing provided with an inlet port, an outlet port and a further outlet port, a pipe section within said casing and provided with a passageway in communication with said inlet port, a pressure control valve seat at the end of said pipe section, a pressure control valve, a first spring urging said pressure control valve to engage said seat against the direction of pressure flow in said passageway, a cover member secured to said casing and provided with an outlet, a diaphragm clamped between said casing and said cover member and provided with a pressure discharge port and an opening, said opening affording communication between said outlet in said cover member and said further outlet port in said casing, a pressure relief valve controlling said pressure discharge port and adapted to seat directly against said diaphragm on the casing side thereof to close said pressure discharge port, means connecting said pressure relief valve with said pressure control valve whereby both valves are movable in unison in the same direction, a second spring in the cover member urging said diaphragm toward said pressure relief valve, a diaphragm-supporting plate within said cover member and provided with a shank through which the pressure of said second spring is transmitted to said diaphragm, a spring pressure plate interposed between said second spring and said shank, and abutment means for limiting the movement of said spring pressure plate and thereby also limiting the movement of said diaphragm under the influence of said second spring, said abutment means guiding said shank during movement of the latter, whereby fluid passing into said cover member through said pressure discharge port will be discharged by passing successively through said outlet in said cover member, said opening in said diaphragm and said further outlet in said casing.

9. A pressure control apparatus comprising a casing provided with an inlet port and an outlet port, a pipe section within said casing and provided with a passageway in communication with said inlet port, a pressure control valve seat at the end of said pipe section, a pressure control valve, means urging the pressure control valve to engage said seat against the direction of pressure flow in said passageway, a cover member secured to said casing and provided with an outlet, a diaphragm clamped between said casing and said cover member and provided with a pressure discharge port, a pressure relief valve controlling said pressure discharge port and seating directly against said diaphragm on the casing side thereof in closing off said pressure discharge port, means connecting said pressure relief valve with said pressure control valve, whereby both valves are movable in unison in the same direction, and a spring in said cover member urging said diaphragm toward said pressure relief valve.

10. A pressure control apparatus comprising a casing provided with an inlet port and an outlet port, a pipe section within said casing and provided with a passageway in communication with said inlet port, a pressure control valve seat at the end of said pipe section, a pressure control valve, means urging the pressure control valve to engage said seat aagínst the direction of pressure flow in said passageway, a cover member secured to said casing and provided with an outlet, a diaphragm clamped between said casing and said cover member and provided with a pressure discharge port, a pressure relief valve controlling said pressure discharge port, means connecting said pressure relief valve with said pressure control valve, whereby both valves are movable in unison in the same direction, and a spring in said cover member urging said diaphragm toward said pressure relief valve, said casing being provided with a further outlet port separated from the remainder of said casing by said diaphragm, and said diaphragm being provided with an opening affording communication between said outlet in said cover member and said further outlet in said casing, whereby fluid passing into said cover member through said pressure discharge port will be discharged by passing successively through said outlet in said cover member, said opening in said diaphragm and said further outlet in said casing.

11. A pressure control apparatus comprising a casing provided with an inlet port and an outlet port, a pipe section within said casing and provided with a passageway in communication with said inlet port, a pressure control valve seat at the end of said pipe section, a pressure control valve, means urging the pressure control valve to engage said seat against the direction of pressure flow in said passageway, a cover member secured to said casing and provided with an outlet, a diaphragm clamped between said casing and said cover member and provided with a pressure discharge port, a pressure relief valve controlling said pressure discharge port, means connecting said pressure relief valve with said pressure control valve, whereby both valves are movable in unison in the same direction, guide means on said pipe section, said pressure relief valve being directed by said guide means to act on said pressure discharge port of said diaphragm, and a spring in said cover member urging said diaphragm toward said pressure relief valve.

12. A pressure control apparatus comprising a casing provided with an inlet port and an outlet port, a pipe section within said casing and provided with a passageway in communication with said inlet port, a pressure control valve seat at the end of said pipe section, a pressure control valve, means urging the pressure control valve to engage said seat against the direction of pressure flow in said passageway, a cover member secured to said casing and provided with an outlet, a diaphragm clamped between said casing and said cover member and provided with a pressure discharge port, a pressure relief valve controlling said pressure discharge port, means connecting said pressure relief valve with said pressure control valve, whereby both valves are movable in unison in the same direction, and a spring in said cover member urging said diaphragm toward said pressure relief valve, the pressure reducing valve being moved away from its seat by a movement of the diaphragm transmitted to the pressure reducing valve through the pressure relief valve.

13. A pressure control apparatus as defined in claim 12, wherein said pressure relief valve seats directly against said diaphragm on the casing side thereof in closing off said pressure discharge port.

14. A pressure control apparatus as defined in claim 12, including a diaphragm-supporting plate through which the pressure of said spring is transmitted to said diaphragm, and abutment means for limiting the movement of said diaphragm.

15. A pressure control apparatus as defined in claim 12, wherein said casing is provided with a further outlet port separated from the remainder of said casing by said diaphragm, said diaphragm being provided with an opening affording communication between said outlet in said cover member and said further outlet in said casing, whereby fluid passing into said cover member through said pressure discharge port will be discharged by passing successively through said outlet in said cover member, said opening in said diaphragm and said further outlet in said casing.

16. A pressure control apparatus as defined in claim 12, including guide means on said pipe section, said pressure relief valve being directed by said guide means to act on said pressure discharge port of said diaphragm.

References Cited in the file of this patent

UNITED STATES PATENTS

| | | |
|---|---|---|
| 2,089,144 | Work | Aug. 3, 1937 |
| 2,707,966 | Taplin | May 10, 1955 |
| 2,710,163 | Mueller | June 7, 1955 |
| 2,720,887 | Safford | Oct. 18, 1955 |

FOREIGN PATENTS

| | | |
|---|---|---|
| 1,083,517 | France | June 20, 1954 |